(12) United States Patent
Kanno et al.

(10) Patent No.: US 8,250,803 B1
(45) Date of Patent: Aug. 28, 2012

(54) INSECT TRAP

(76) Inventors: Badrih S. Kanno, Lincolnwood, IL (US); Joseph S. Kanno, Lincolnwood, IL (US)

( * ) Notice: Subject to any disclaimer, the term of this patent is extended or adjusted under 35 U.S.C. 154(b) by 270 days.

(21) Appl. No.: 12/752,724

(22) Filed: Apr. 1, 2010

(51) Int. Cl.
*A01M 1/14* (2006.01)

(52) U.S. Cl. .................. 43/114; 43/116; 43/136

(58) Field of Classification Search .................. 43/114, 43/116, 136
See application file for complete search history.

(56) References Cited

U.S. PATENT DOCUMENTS

| | | | |
|---|---|---|---|
| 811,875 A * | 2/1906 | Samuels | 43/114 |
| 1,265,932 A | 5/1918 | Maltby | |
| 2,328,591 A | 9/1943 | Weil | |
| 2,340,256 A | 1/1944 | Weil | |
| 2,911,756 A * | 11/1959 | Geary | 43/114 |
| 3,816,956 A * | 6/1974 | Sekula | 43/114 |
| 3,913,259 A | 10/1975 | Nishimura et al. | |
| 3,940,874 A | 3/1976 | Katsuda | |
| 4,126,959 A | 11/1978 | Graham | |
| 4,161,079 A | 7/1979 | Hill | |
| 4,244,134 A | 1/1981 | Otterson | |
| 4,395,842 A | 8/1983 | Margulies | |
| 4,608,774 A | 9/1986 | Sherman | |
| 4,876,823 A * | 10/1989 | Brunetti | 43/114 |
| 4,908,976 A | 3/1990 | Dagenais | |
| D313,641 S | 1/1991 | Caprioli | |
| 5,031,354 A | 7/1991 | Olson | |
| 5,175,956 A * | 1/1993 | Hover et al. | 43/58 |
| 5,253,448 A * | 10/1993 | Byom | 43/114 |
| 5,531,043 A | 7/1996 | Shiboh | |
| 5,950,353 A | 9/1999 | Johnson et al. | |
| 6,594,947 B2 | 7/2003 | Lingren et al. | |
| 6,998,133 B2 * | 2/2006 | Simpson | 424/409 |
| 2006/0248783 A1 * | 11/2006 | Lindquist et al. | 43/113 |
| 2007/0011942 A1 * | 1/2007 | Hawkins, Jr. | 43/114 |
| 2007/0193109 A1 * | 8/2007 | Chyun | 43/114 |
| 2009/0293342 A1 * | 12/2009 | Winkler | 43/114 |
| 2011/0016771 A1 * | 1/2011 | Crouse et al. | 43/136 |

* cited by examiner

*Primary Examiner* — Christopher P Ellis
(74) *Attorney, Agent, or Firm* — Montgomery Patent & Design, LLC; Robert C. Montgomery; Joseph T. Yaksich

(57) ABSTRACT

An insect trap comprising a transparent tube coated on an exterior surface with a tacky adhesive is placed where insects typically travel. When the insects crawl over the tube, they become ensnarled and stuck in the adhesive. The trap is preferably available in a kit comprising a variable quantity of tubes in a housing and a means to customize the length of tubes.

17 Claims, 4 Drawing Sheets

INSECT TRAP

RELATED APPLICATIONS

The present invention was first described in a notarized Official Record of Invention on Feb. 8, 2008, that is on file at the offices of Montgomery Patent and Design, LLC, the entire disclosures of which are incorporated herein by reference.

FIELD OF THE INVENTION

The present invention relates generally to insect traps, and in particular, to a customizable disposable insect trap adapted for use with a variety of insects.

BACKGROUND OF THE INVENTION

Insect populations of various species are prevalent pests in every part of the world. The hardiness, small size, and large numbers associated with insects make them troublesome to deal with when an infestation or similar problem should arise. One (1) common approach utilized in an attempt to control insect populations in homes and the like is that of placing insect traps.

Insect traps are generally devices which are placed strategically throughout a house, building or the like in an attempt to remove a large enough percentage of an insect population to deter further pestilence. These traps utilize a variety of mechanisms in order to capture and eliminate bugs of various types, including insect attractants, poisonous chemicals, mechanical enclosures, and the like.

Various attempts have been made to provide differing types of effective insect traps. Examples of these attempts can be seen by reference to several U.S. patents. U.S. Pat. No. 3,913,259, issued in the name of Nishimura et al., describes a composition and device for capturing cockroaches. The Nishimura device provides a small disposable housing with adhesive disposed on an interior surface.

U.S. Pat. No. 4,608,774, issued in the name of Sherman, describes a construction for roach traps with a funnel-like top portion which allows roaches to enter the device which preventing their exit therefrom.

U.S. Pat. No. 6,594,947, issued in the name of Lingren et al., describes a device for capturing or repelling insects. The Lingren device utilizes chemical compounds which provide an attracting or repellent function to the device, as desired for purposes of either trapping or warding of insects, respectively.

While these devices fulfill their respective, particular objectives, each of these references suffer from one (1) or more of the aforementioned disadvantages. Many such devices are of a large construction which makes them unsightly and difficult to utilize in a variety of locations. Also, many such devices are not easily adaptable to different sizes or lengths. In addition, many such devices pose hazards or annoyances to the users. Furthermore, many such devices are only particularly suited for certain insects. Accordingly, there exists a need for an insect trapping device without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a means to provide an insect trap which is safe and slightly for common household or residential use via features of wide applicability and customizability. Thus, the object of the present invention is to solve the aforementioned disadvantages and provide for this need.

To achieve the above objectives, it is an object of the present invention to provide a means to inconspicuously exterminate insects. The invention comprises a housing structure which retains a coiled length of tubing with an adhesive outer surface.

Another object of the present invention is to provide features of both attachability and insect trapping via the adhesive outer surface of the tubing.

Yet still another object of the present invention is to provide a protective housing and packaging enclosure to the tubing via the housing, which comprises a disposable rectangular structure fabricated from common materials such as paper, cardboard, or the like.

Yet still another object of the present invention is to allow a user to easily cut a desired length of tubing by a conventional means such as scissors or the like. The core of the tubing is constructed of a common flexible, lightweight material such as polyethylene, polystyrene, or the like for easy cutting.

Yet still another object of the present invention is to allow a user to easily remove a desired amount of tubing from the housing. The housing further comprises a round aperture on a side surface through which the tubing is removed. The tubing further comprises a non-stick strip on an exterior surface, which provides a removable barrier between the adhesive exterior of the tubing core and the housing to allow for easy movement. The tubing further comprises a string which is adhesively attached to an interior surface of the tubing to provide a user with a means of easily removing the tubing. The tubing is preferably retained within the housing in a coiled configuration for easy of removal.

Yet still another object of the present invention is to provide a method of utilizing the device that provides a unique means of exposing a portion of tubing from the housing, cutting the tubing to a desired length, removing the non-stick strip from the exterior of the tubing to expose the adhesive, selectively locating the tubing in a desired location for maximum effectiveness, and providing a means for trapping insects in a manner which is safe and which limits physical and aesthetic obtrusion into a household, workplace, or the like.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
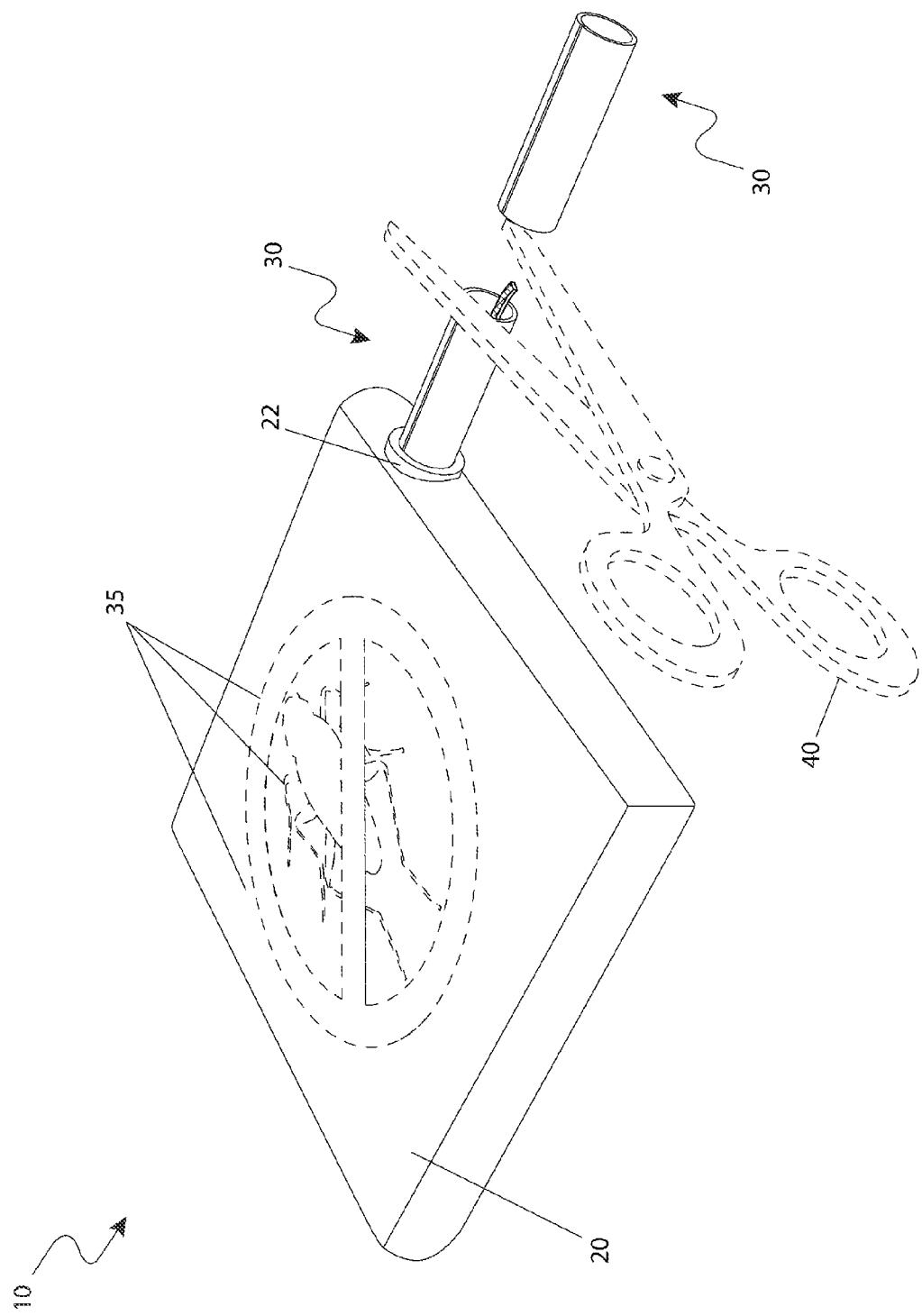
FIG. 1 is an environmental view of an insect trap 10 depicting length customization, according to a preferred embodiment of the present invention.

DESCRIPTIVE KEY 10 insect trap
20 housing structure
21 interior structure
22 aperture
30 tubing
31 core
32 non-stick strip
33 gap
34 adhesive surface
35 indicia
36 string
37 string adhesive
40 scissors

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a customization insect trap system (herein described as the "kit") 10 which provides a means to inconspicuously exterminate insects. The kit 10 comprises a housing structure 20 which retains a coiled length of tubing 30 further comprising an adhesive 34 outer surface which enables said tubing 30 to be adhesively attached to a desired location to entrap insects thereon, thereby exterminating said insects. The kit 10 may be used in a variety of locations infested with a variety of insects.

Referring now to FIG. 1, an environmental view of kit 10, according to the preferred embodiment of the present invention, is disclosed. The kit 10 comprises a rectangular housing structure 20, thereby providing a protective housing and packaging enclosure to an internal length of tubing 30 (see FIG. 2). The tubing 30 is arranged in a coil-like fashion within the housing structure 20 and is removably inserted by means of an aperture 22 located on a side surface of the housing structure 20. The tubing 30 is extracted from the aperture 22 and cut to variable user specified lengths via commercially available scissors 40 or other cutting mechanisms. A length of string 36 (also see FIG. 2) is adhered to an inner bottom surface of the tubing 30 which is utilized to assist in removing said tubing 30 from the aperture 22. A cut section of tubing 30 may then be placed upon insect infested areas such as, but not limited to: baseboards, beneath refrigerators, countertops, windows, and the like. The housing structure 20 is disposable and fabricated from materials such as, but not limited to: pressed paper, corrugated cardboard laminate, or the like. An exterior surface of the housing structure 20 may incorporate indicia 35 which may provide script or logos based upon a user's preference and may include images such as, but not limited to: names/logos, personal names, symbols, pictures, and the like to further customize and personalize the kit 10 further comprising a variety of colors and patterns. The indicia 35 is depicted herein as being located on an upper surface for illustration purposes only; it is known that other locations may be utilized without limiting the scope of the kit 10.

Figure 2:
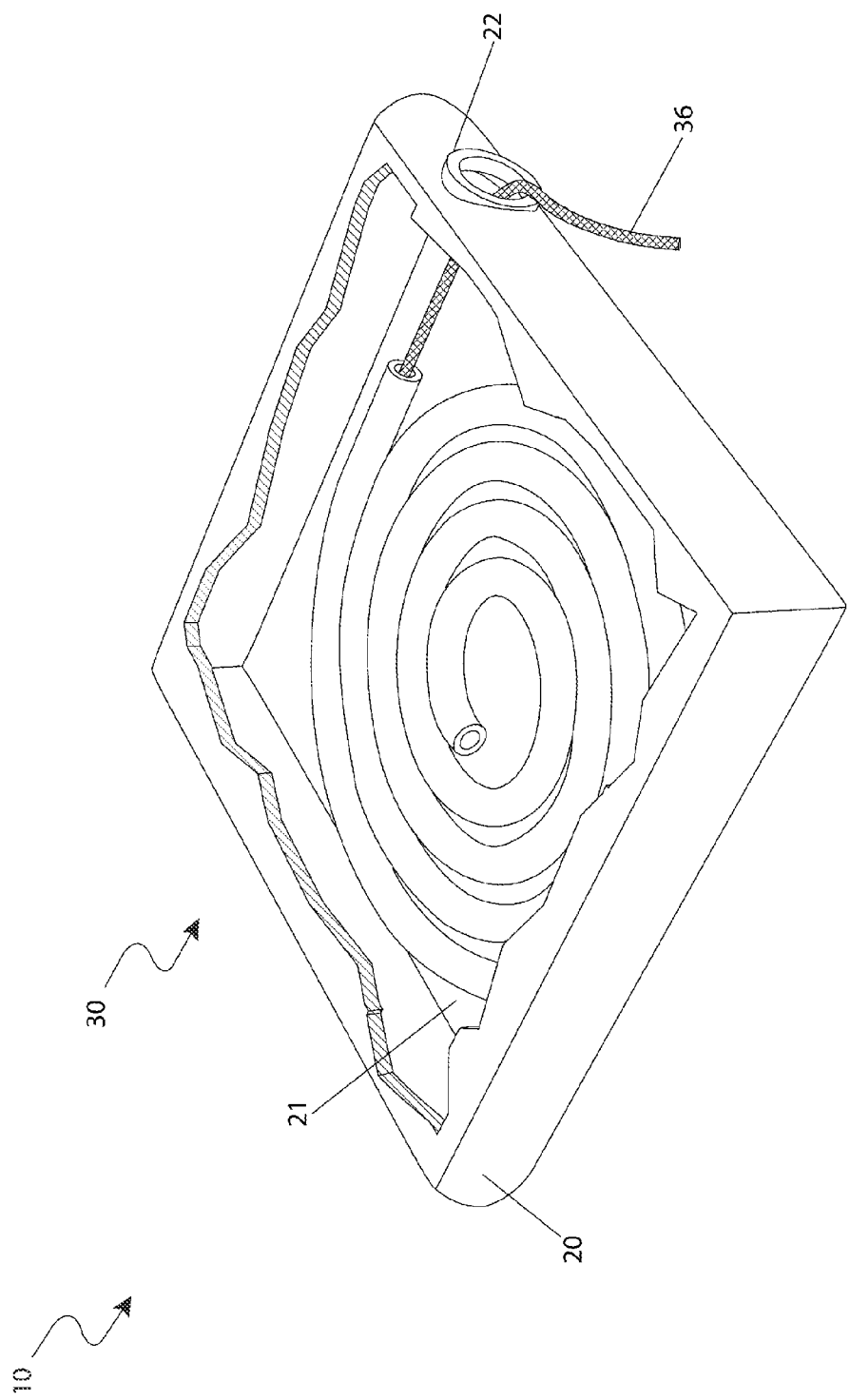
FIG. 2 is a perspective cut-away view of a housing structure 20 depicting placement of a coil of tubing 30 within, according to a preferred embodiment of the present invention.

Referring now to FIG. 2, a perspective cut-away view of the housing structure 20 depicting placement of the coil of tubing 30 within, according to the preferred embodiment of the present invention, is disclosed. The kit 10 is depicted herein with an upper surface of the housing structure 20 cut-away for illustration purposes only. It is known that the housing structure 20 contains expected features to completely enclose the tubing 30 within such as, but not limited to: an upper surface, a bottom surface, and a plurality of side surfaces. The aperture 22 enables a desired length of tubing to be removed from the housing structure 20. An inner diameter of the aperture 22 is slightly larger than an outer diameter of the tubing 30, thereby enabling said tubing 30 to slidably engage the aperture 22 for removal. The aperture 22 is depicting herein as being located thereon a side surface of the housing structure 20 for illustration purposes only it is known that other locations may be utilized without limiting the scope of the kit 10. The length of string 36 is routed through the length of the tubing 20 and adhered to the inner bottom surface of said tubing 30 via a string adhesive 37. The string 36 is fabricated from materials such as, but not limited to: nylon, cotton, or the like. The string adhesive 37 may be a variety of bonding mediums which bind the string 36 to the tubing 30. In use, the user may pull the string 36 out from the aperture 22 which concurrently removes the tubing 30. As the user cuts the tubing 30 to a desired length the string 36 may also be cut or remained uncut for an additional length during subsequent use.

Figure 3:
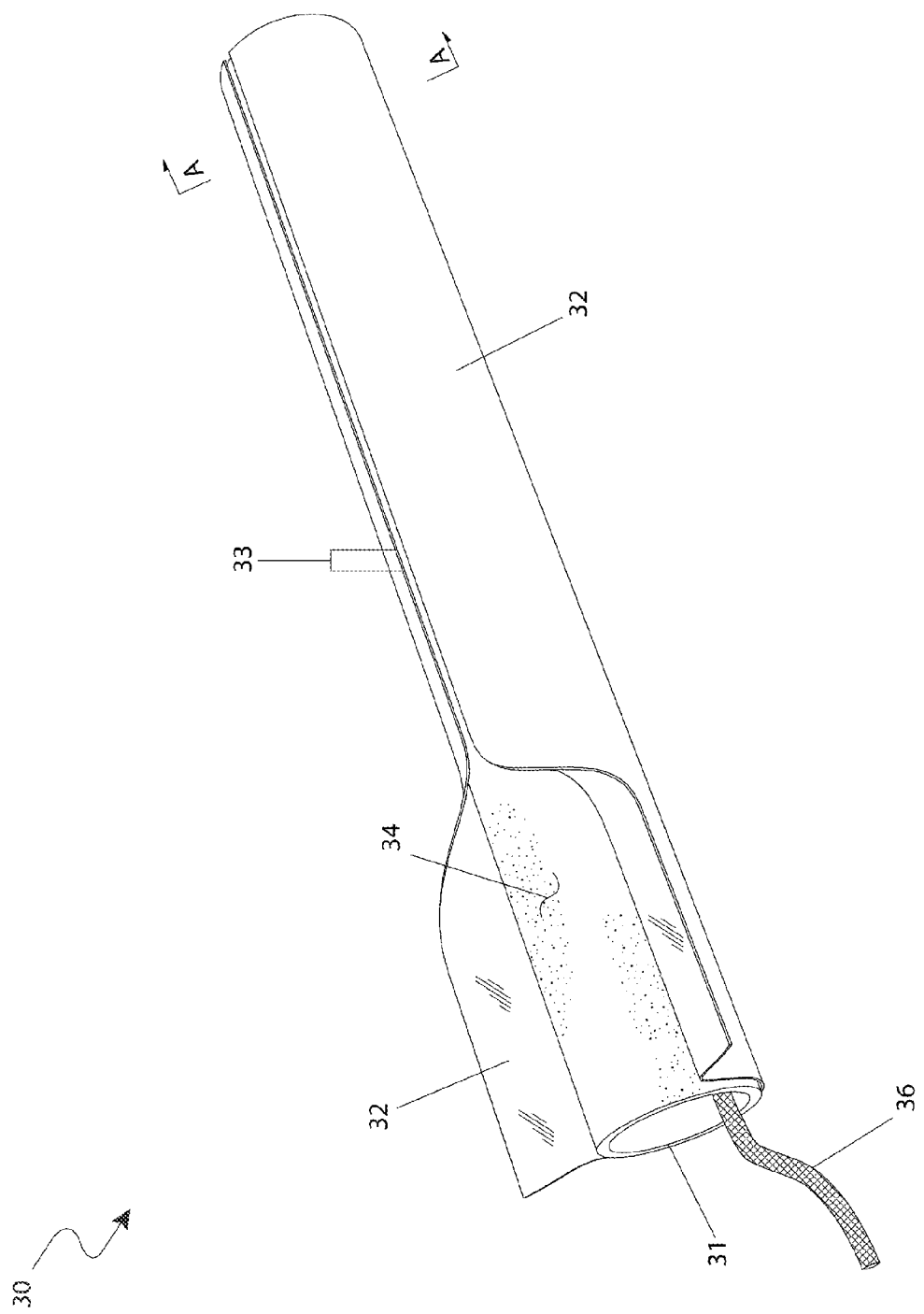
FIG. 3 is a perspective view of the tubing 30, according to a preferred embodiment of the present invention; and, FIG. 4 is a section view of the tubing 30 taken along line A-A (see FIG. 3), according to a preferred embodiment of the present invention.
Figure 4:
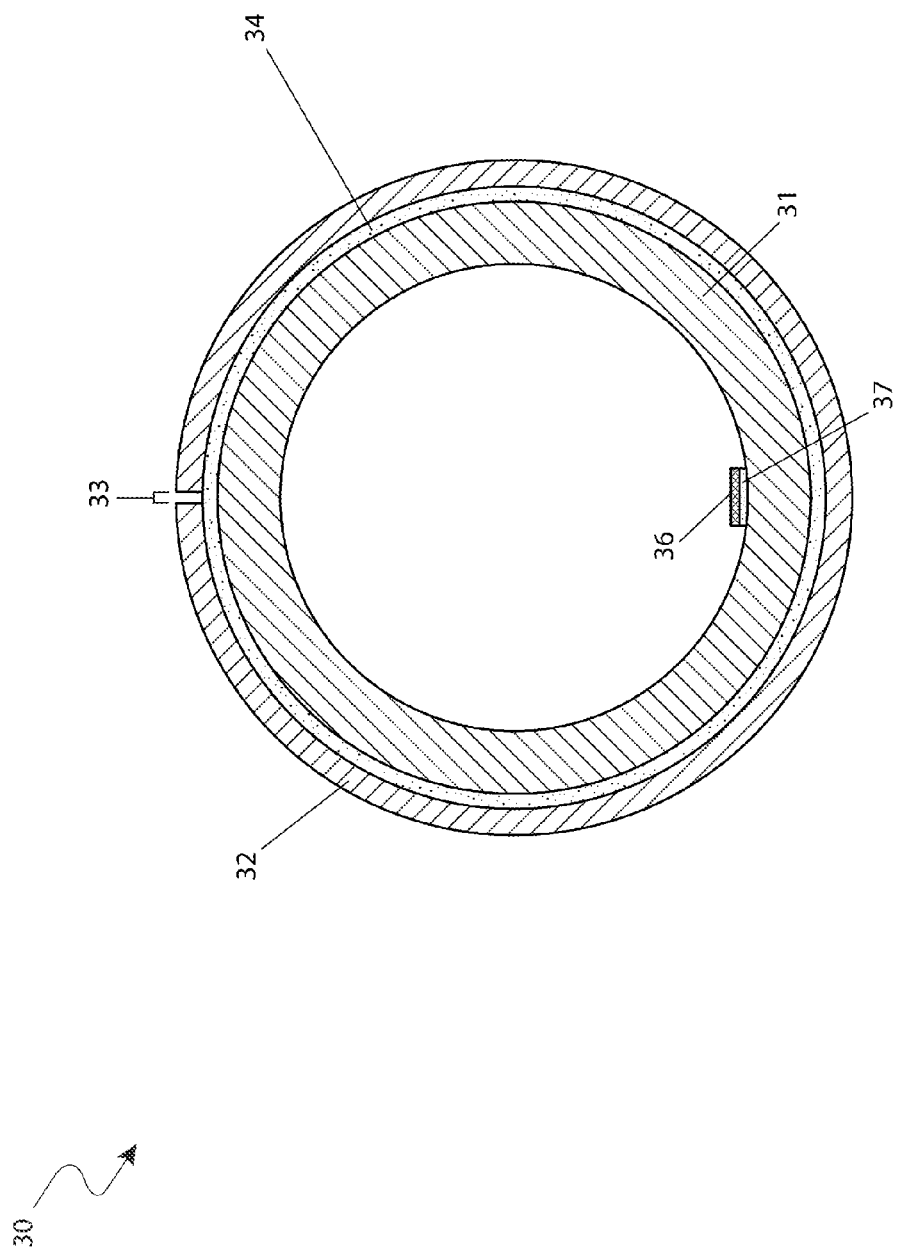

Referring now to FIG. 3, a perspective drawing of the tubing 30 of kit 10 and FIG. 4, a section view of the tubing 30 taken along line A-A (see FIG. 3), according to the preferred embodiment of the present invention, are disclosed. The tubing 30 comprises a core 31 coated with an adhesive surface 34 and a non-stick strip 32 on an outer surface of said core 31. Dimensions of the tube 30 are approximately five-eighths (⅝) inches in diameter and approximately twelve (12) feet long. The core 31 is fabricated from materials such as, but not limited to: polyethylene, polystyrene, or the like. As abovementioned the outer surface of the core 31 is coated with an adhesive surface 34 which provides for a tacky surface to entrap the insects and enables the tubing 20 to be positioned on a desired surface. The non-stick strip 32 wraps around the exterior surface of the core 31 upon the adhesive surface 34, thereby providing encasement to a permanently tacky adhesive surface 34. The non-stick strip 32 prohibits the adhesive surface 34 from attaching to surfaces prior to application. The longitudinal edges of the non-stick strip 32 create a gap 33 to enable the user to remove said non-stick strip 32 via a peeling means from the adhesive surface 34. The non-stick strip 32 is to be fabricated from a wax-coated moisture-proof paper, yet other materials may be utilized without limiting the scope of the kit 10. When the non-stick strip 32 is removed the user may utilize the adhesive surface 34 by adhering the tubing 30 in a desired infested area to entrap insects.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the kit 10, it would be installed as indicated in FIG. 1.

The method of utilizing the kit 10 may be achieved by performing the following steps: acquiring the kit 10; locating the aperture 22 thereon the side portion of the housing structure 20; extracting the tubing 30 from the aperture 22 via the string 36; cutting the tubing 30 to a user specified length; cutting the string 36 as desired; peeling the non-stick strip 32 off of the exterior surface of the core 31, thereby revealing the adhesive surface 34; placing the tubing 30 at a desired infested area; discarding tubing 30 when full of insects; repeating as necessary; and, discarding the kit 10 when empty.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. An insect trap, comprising:
   a housing, comprising an enclosed interior and an aperture enabling access to said interior; and,
   a length of flexible tubing housed within said interior, removably extracted through said aperture;
   wherein said length of tubing is deployed at a desired location for entrapment of insects thereto;
   wherein said length of tubing comprises a trapping means for insects and other pests upon contact thereon; and,
   wherein said housing provides a protective enclosure for said length of tubing when not is use.

2. The insect trap of claim 1, wherein said length of tubing is truncated at a desired length for deployment thereof.

3. The insect trap of claim 1, wherein said length of tubing is in a coiled disposition within said interior of said housing.

4. The insect trap of claim 1, wherein said housing further comprises a disposable paper-based enclosure.

5. The insect trap of claim 1, further comprising indicia located on an exterior of said housing, thereby clearly indicating said insect trap.

6. The insect trap of claim 1, wherein said length of tubing further comprises:
   a core, coated with said trapping means along on outer circumference thereof; and,
   a protective removable backing covering said trapping means, comprising a bifurcated body substantially enclosing around said core and defining a gap between bifurcated edges;
   wherein said gap provides a means for a user to grasp and remove said backing from said trapping means.

7. The insect trap of claim 1, wherein said trapping means further comprises an adhesive substance;
   wherein said adhesive substance provides a stable placement means for said length of tubing at said desired location.

8. The insect trap of claim 1, wherein said length of tubing further comprises a length of string adhered to an inner bottom surface to assist in removal of said length of tubing from said interior of said housing.

9. The insect trap of claim 1, wherein said length of tubing comprises a lightweight and resilient plastic material.

10. The insect trap of claim 1, wherein said length of tubing further comprises a diameter of approximately five-eighths of an inch and a length of approximately twelve feet.

11. An insect trap, comprising:
    a housing, comprising an enclosed interior and an aperture enabling access to said interior; and,
    a coiled length of flexible tubing housed within said interior, removably extracted through said aperture, further comprising:
      a core;
      an adhesive substance bonded to an outer circumference of said core;
      a protective removable backing covering said adhesive substance, comprising a bifurcated body substantially enclosing around said core and defining a gap between bifurcated edges, thereby providing a means for a user to grasp and remove said backing from said trapping means; and,
      a length of string adhered to an inner bottom surface of said core to assist in removal of said length of tubing from said interior of said housing through said aperture;
    wherein said length of tubing is deployed at a desired location for entrapment of insects thereto;
    wherein said adhesive substance provides a stable placement means for said length of tubing at said desired location;
    wherein said length of tubing comprises a trapping means for insects upon contact thereon; and,
    wherein said housing provides a protective enclosure for said length of tubing when not is use.

12. The insect trap of claim 11, wherein said length of tubing is truncated at a desired length for deployment thereof.

13. The insect trap of claim 11, wherein said housing further comprises a disposable paper-based enclosure.

14. The insect trap of claim 11, further comprising indicia located on an exterior of said housing, thereby clearly indicating said insect trap.

15. The insect trap of claim 11, wherein said length of tubing comprises a lightweight and resilient plastic material.

16. The insect trap of claim 11, wherein said length of tubing further comprises a diameter of approximately five-eighths of an inch and a length of approximately twelve feet.

17. A method for trapping insects and other pests comprises the steps of:
    providing said insect trap, further comprising:
      a housing, comprising an enclosed interior and an aperture enabling access to said interior; and,
      a coiled length of flexible tubing housed within said interior, removably extracted through said aperture, further comprising:
        a core;
        an adhesive substance bonded to an outer circumference of said core;
        a protective removable backing covering said adhesive substance, comprising a bifurcated body substantially enclosing around said core and defining a gap between bifurcated edges, thereby providing a means for a user to grasp and remove said backing from said trapping means; and,
        a length of string adhered to an inner bottom surface of said core to assist in removal of said length of tubing from said interior of said housing through said aperture;

grasping said length of string and pulling a desired length of said tubing out through said aperture;

cutting said desired length of said tubing;

removing said backing from said core of said desired length of tubing, thereby exposing said adhesive substance;

placing said desired length of tubing at a desired location to trap said insects and other pests, wherein said adhesive substance provides a stable placement of said desired length of tubing at said desired location;

trapping said insects and other pests on said adhesive substance.

* * * * *